(12) United States Patent
Saija

(10) Patent No.: US 11,395,131 B2
(45) Date of Patent: Jul. 19, 2022

(54) CONNECTION ESTABLISHMENT

(71) Applicant: Telia Company AB, Solna (SE)

(72) Inventor: Timo Saija, Espoo (FI)

(73) Assignee: TELIA COMPANY AB, Solna (SE)

(*) Notice: Subject to any disclaimer, the term of this patent is extended or adjusted under 35 U.S.C. 154(b) by 43 days.

(21) Appl. No.: 16/355,450

(22) Filed: Mar. 15, 2019

(65) Prior Publication Data
US 2019/0289458 A1 Sep. 19, 2019

(30) Foreign Application Priority Data
Mar. 15, 2018 (FI) ...................................... 20185245

(51) Int. Cl.
H04W 8/18 (2009.01)
H04W 76/11 (2018.01)

(52) U.S. Cl.
CPC ............ *H04W 8/186* (2013.01); *H04W 76/11* (2018.02)

(58) Field of Classification Search
CPC .............................. H04W 76/11; H04W 8/186
USPC ........................................................ 455/435
See application file for complete search history.

(56) References Cited

U.S. PATENT DOCUMENTS

| 6,584,326 | B1* | 6/2003 | Boydston ............. G06F 13/385 |
| | | | 455/423 |
| 9,185,530 | B2 | 11/2015 | Gomes et al. |
| 9,438,740 | B2* | 9/2016 | Baek ...................... H04W 8/183 |
| 10,154,539 | B2 | 12/2018 | Mohan et al. |
| 2004/0229601 | A1 | 11/2004 | Zabawskyj et al. |
| 2013/0130684 | A1* | 5/2013 | Gomes .................. H04W 88/04 |
| | | | 455/435.1 |
| 2013/0189955 | A1* | 7/2013 | Horn ....................... H04W 4/08 |
| | | | 455/411 |
| 2014/0024387 | A1* | 1/2014 | Ra ......................... H04W 12/06 |
| | | | 455/452.1 |

(Continued)

FOREIGN PATENT DOCUMENTS

| EP | 3285472 A1 | 2/2018 |
| WO | 2011123755 A1 | 10/2011 |

(Continued)

OTHER PUBLICATIONS

European Search Report for Application No. 19 16 2062, dated May 3, 2019.

(Continued)

*Primary Examiner* — Charles N Appiah
*Assistant Examiner* — Nicole M Louis-Fils
(74) *Attorney, Agent, or Firm* — Nixon & Vanderhye

(57) ABSTRACT

Disclosed is a method for establishing a connection to a terminal device equipped with a subscriber identity module. The method includes: defining the plurality of subscriber identity modules as a group; defining, for at least one of the plurality of subscriber identity modules, at least one characteristic relating to accessing the at least one subscriber identity module; in response to a receipt of a connection request in a terminal device inquiring the at least one characteristic; and establishing, from the terminal device, a connection to the terminal device indicated in the connection request in accordance with the at least one characteristic relating to accessing the at least one subscriber identity module. Also disclosed is a terminal device, a system and a computer program product.

17 Claims, 3 Drawing Sheets

(56) References Cited

U.S. PATENT DOCUMENTS

| | | | |
|---|---|---|---|
| 2015/0334554 A1* | 11/2015 | Song | H04W 12/06 455/558 |
| 2016/0014579 A1* | 1/2016 | Kasilya Sudarsan | H04W 76/15 455/553.1 |
| 2016/0029268 A1 | 1/2016 | Gomes et al. | |
| 2016/0094930 A1* | 3/2016 | Ramanna | H04B 1/3816 455/558 |
| 2016/0105540 A1* | 4/2016 | Kwon | H04N 21/41407 715/747 |
| 2017/0118347 A1* | 4/2017 | Yu | H04M 3/543 |
| 2018/0027603 A1* | 1/2018 | Lee | H04W 8/005 370/329 |
| 2018/0115932 A1 | 4/2018 | Gomes et al. | |

FOREIGN PATENT DOCUMENTS

| | | |
|---|---|---|
| WO | 2012/034598 | 3/2012 |
| WO | 2016/050028 A1 | 4/2016 |
| WO | 2016/196577 A1 | 12/2016 |

OTHER PUBLICATIONS

FI Search Report, dated Oct. 11, 2018, from corresponding FI application No. 20185245.

* cited by examiner

| ID | Access characteristic(s) |
|---|---|
| SIM-M | A, B, C |
| SIM-1 | B |
| SIM-2 | B, C |

| ID | Access characteristic(s) | | | |
|---|---|---|---|---|
| | Device type | Communication Type | Access protocol | Functionality |
| SIM-M | Mobile phone | Call, SMS, MMS, data | GSM, 3G, 4G | Call, configure, modify |
| SIM-1 | Thermometer | SMS, data | 3G | Configure |
| SIM-2 | Game console | data | 4G | Configure, modify |

CONNECTION ESTABLISHMENT

TECHNICAL FIELD

The invention concerns in general the technical field of telecommunications. More particularly, the invention concerns a connection establishment.

BACKGROUND

Mobile communication networks are operated by so called telecom operators. This means that the telecom operator in question maintain and manages the mobile communication network and as a result provides communication service to subscribers. The subscribers may utilize the communication service with their pieces of user equipment equipped with subscriptions, which enable the access to the mobile communication network. The subscription refers e.g. to a so-called subscriber identity module (SIM) installed in the user equipment. Some user equipments allow an installation of a plurality of SIMs in the device, and thus the user may utilize any subscription for his/her communication according to needs.

Due to increased number of networked devices a number of SIM cards has increased tremendously. As a result, one person may own a plurality of devices operating in a plurality of locations, which causes challenges in managing all the subscriptions. In a worst case, the person may loss his/her devices because of a complexity of management of the devices, and thus the subscriptions.

For background information purposes it is also worthwhile to mention that the existing SIMs act conceptually as follows: SIM cards store network-specific information used to authenticate and identify subscribers on the network. The most important of these are the ICCID, IMSI, Authentication Key (Ki), Local Area Identity (LAI) and Operator-Specific Emergency Number. The SIM also stores other carrier-specific data such as the SMSC (Short Message Service Center) number, Service Provider Name (SPN), Service Dialing Numbers (SDN), Advice-Of-Charge parameters and Value Added Service (VAS) applications.

Hence, in order to mitigate, at least in part, challenges especially in the management of SIMs due to increased number of the SIMs possessed by users there is need to develop sophisticated solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a terminal device, a system and a computer program product for establishing a connection.

The objectives of the invention are reached by a method, a terminal device, a system and a computer program product as defined by the respective independent claims.

According to a first aspect, a method for establishing a connection to a terminal device equipped with a subscriber identity module is provided, the method comprising: defining the plurality of subscriber identity modules as a group in a memory of a first subscriber identity module belonging to the group; defining, for at least one of the plurality of subscriber identity modules belonging to the group, at least one characteristic relating to accessing the at least one subscriber identity module; in response to a receipt of a connection request in a terminal device equipped with the first subscriber identity module, the connection request indicating a subscriber identity module belonging to the group as a destination of the connection request, inquiring the at least one characteristic relating to accessing the at least one subscriber identity module from the memory of the first subscriber identity module; and establishing, from the terminal device equipped with the first subscriber identity module, a connection to the terminal device equipped with the subscriber identity module indicated in the connection re-quest in accordance with the at least one characteristic relating to accessing the at least one subscriber identity module.

The at least one characteristic relating to accessing the at least one subscriber identity module may represent at least one of the following: communication type, device type, access protocol, functionality available for use with respect to the subscriber identity module.

The inquiry of the at least one characteristic relating to accessing the at least one subscriber identity module from the memory of the first subscriber identity module may comprise: generating the inquiry to the memory by including the identifier of the subscriber identity module in the inquiry; and receiving, in response to the inquiry, data associated to the identifier in the memory, the data representing the at least one characteristic.

The connection request indicating the subscriber identity module belonging to the group as the destination of the connection request may be one of the following: a call setup signaling, a message transmittable over a mobile communication network, at least one data packet conveyed over a data connection.

Further, the definition of the plurality of the subscriber identity modules as the group in the memory of the first subscriber identity module and the definition of the at least one characteristic relating to accessing the at least one subscriber identity module in the memory of the first subscriber identity module may be performed by at least one of the following: the terminal device equipped with the first subscriber identity module, a device granted access to the memory of the first subscriber identity module over a communication connection.

According to a second aspect, a terminal device equipped with a first subscriber identity module is provided, the terminal device comprising: at least one processor; at least one memory including computer program code); wherein the at least one memory and the computer program code are configured to, with the at least one processor, cause the terminal device to perform: define the plurality of subscriber identity modules as a group in a memory of a first subscriber identity module belonging to the group; define, for at least one of the plurality of subscriber identity modules belonging to the group, at least one characteristic relating to accessing the at least one subscriber identity module; in response to a receipt of a connection request in the terminal device equipped with the first subscriber identity module), the connection request indicating a subscriber identity module belonging to the group as a destination of the connection request, inquire the at least one characteristic relating to accessing the at least one subscriber identity module from the memory of the first subscriber identity module; and establish, from the terminal device equipped with the first subscriber identity module, a connection to the terminal device equipped with the subscriber identity module indicated in the connection request in accordance with the at least one characteristic relating to accessing the at least one subscriber identity module.

The at least one characteristic relating to accessing the at least one subscriber identity module stored in the memory may represent at least one of the following: communication type, device type, access protocol, functionality available for use with respect to the subscriber identity module.

The terminal device may be configured to, during the inquiry of the at least one characteristic relating to accessing the at least one subscriber identity module from the memory of the first subscriber identity module, to: generate the inquiry to the memory by including the identifier of the subscriber identity module in the inquiry; and receive, in response to the inquiry, data associated to the identifier in the memory, the data representing the at least one characteristic.

The connection request indicating the subscriber identity module belonging to the group as the destination of the connection request may be one of the following: a call setup signaling, a message transmittable over a mobile communication network, at least one data packet conveyed over a data connection.

The terminal device may be configured to define the plurality of the subscriber identity modules as the group in the memory of the first subscriber identity module and the at least one characteristic relating to accessing the at least one subscriber identity module in the memory of the first subscriber identity module either internally or in response to a signaling over a communication connection from a device granted access to the memory of the first subscriber identity module.

According to third aspect, a system is provided, the system comprising: a terminal device equipped with a first subscriber identity module, and at least one other terminal device equipped with a subscriber identity module; wherein the system: defining the first subscriber identity module and the at least one other subscriber identity module as a group in a memory of the first subscriber identity module; defining, for at least one of the plurality of subscriber identity modules belonging to the group, at least one characteristic relating to accessing the at least one subscriber identity module; in response to a receipt of a connection request in the terminal device equipped with the first subscriber identity module, the connection request indicating a subscriber identity module belonging to the group as a destination of the connection request, inquiring the at least one characteristic relating to accessing the at least one subscriber identity module from the memory of the first subscriber identity module; and establishing, from the terminal device equipped with the first subscriber identity module, a connection to the terminal device equipped with the subscriber identity module indicated in the connection request in accordance with the at least one characteristic relating to accessing the at least one subscriber identity module.

According to a fourth aspect, a computer program product for establishing a connection to a terminal device equipped with a subscriber identity module is provided, which, when executed by at least one processor of the terminal device, cause the terminal device to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a communication environment into which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
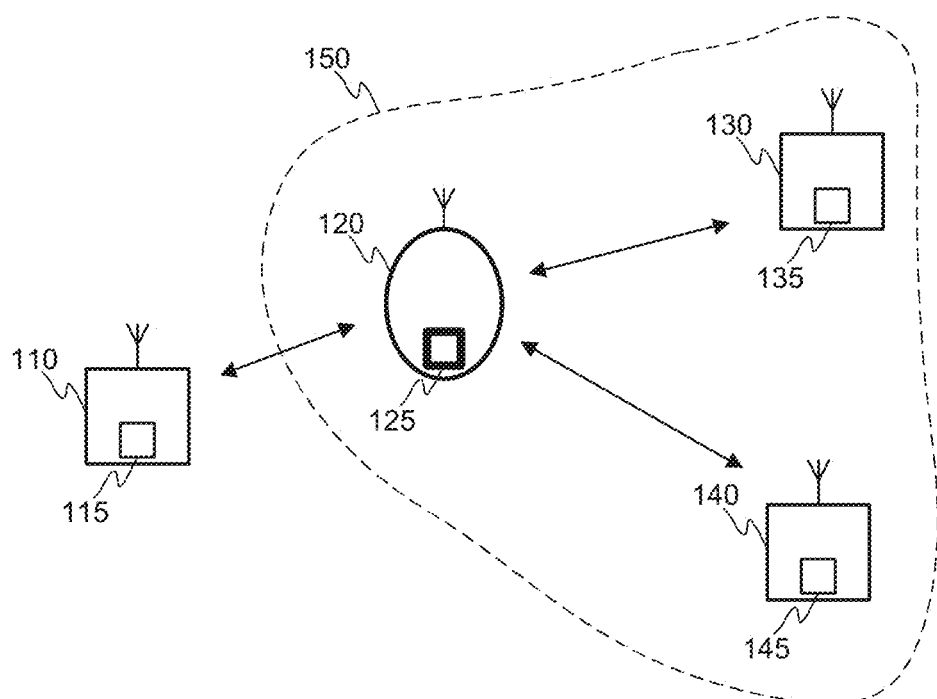

At least some aspects of the present invention are now discussed by referring to FIG. 1 in which it is schematically illustrated an example of a communication environment into which the present invention may be implemented to. Specifically, FIG. 1 provides at least some insight to the present invention by disclosing terminal devices 110, 120, 130, 140 which are equipped with subscriber identity modules (SIM) 115, 125, 135, 145 which are necessary for accessing a mobile communication network. The subscriber identity modules 115, 125, 135, 145 may be implemented in the terminal devices 110, 120, 130, 140 with a physical smart card solution or with a software implementation. The terminal device 110, 120, 130, 140 may be any type of device, which comprises necessary hardware and software implementations for operating such a manner that it may access to the mobile communication network and operate as will be described herein. One aspect of the present invention is to establish a group comprising a plurality of subscriber identity modules. At least one subscriber identity module of the plurality of subscriber identity modules belonging to the group is defined to be a master subscriber identity module through which at least one other subscriber identity module belonging to the group may be accessed. By referring to FIG. 1 it may be considered that the subscriber identity module 125 residing in the terminal device 120 is defined to be the master subscriber identity module in a group 150, whereas the subscriber identity modules 135 and 145 in the terminal devices 130 and 140 correspondingly are accessible through the master subscriber identity module 125. The terminal device 110 equipped with the subscriber identity module 115 is depicted in FIG. 1 for introducing at least one entity external to the group, but which subscriber may communicate with the subscriber represented by the master subscriber identity module 125 and the subscribers represented by the subscriber identity modules 135, 145 over the mobile communication network.

The terminal device 120 in which the master subscriber identity module 125 resides may be a physical terminal device or a virtual entity implemented e.g. as a software system. In the both cases, the master subscriber identity module comprises administrative data as described in FIG. 3 and FIG. 4.

Further, the group 150 of plurality of subscriber identity modules residing in the terminal devices 120, 130, 140 and a terminal device 110 shall all be understood as entity possibilities of a subscriber. One subscriber may have one terminal device 110 with 115 or multiple terminal devices represented by the group 150 and especially with the master subscriber identity module 125 residing in the terminal device 120. One important aspect, among others, for the concept according to the present invention is that the group 150 as such is an extension of a single terminal device 110 equipped with the subscriber identity module 115 to a plurality of subscriber identity modules in the networked group 150 residing in corresponding terminal devices. The present inventive idea is also applicable in a specific embodiment in which a communication between two or more separate groups 150, and to any terminal device belonging in any of the groups 150, may be arranged through the terminal devices 150 equipped with the first subscriber identity module 125, i.e. the master subscriber identity module, of the corresponding group. The invention may also be applied in a situation in which multiple terminal devices 130, 140 belonging to a certain group 150 may concurrently establish a connection over the terminal device 120 equipped with the first subscriber identity module 125 to one or more destination terminal devices. This idea refers to so called multi-conferencing concept.

Figure 2:
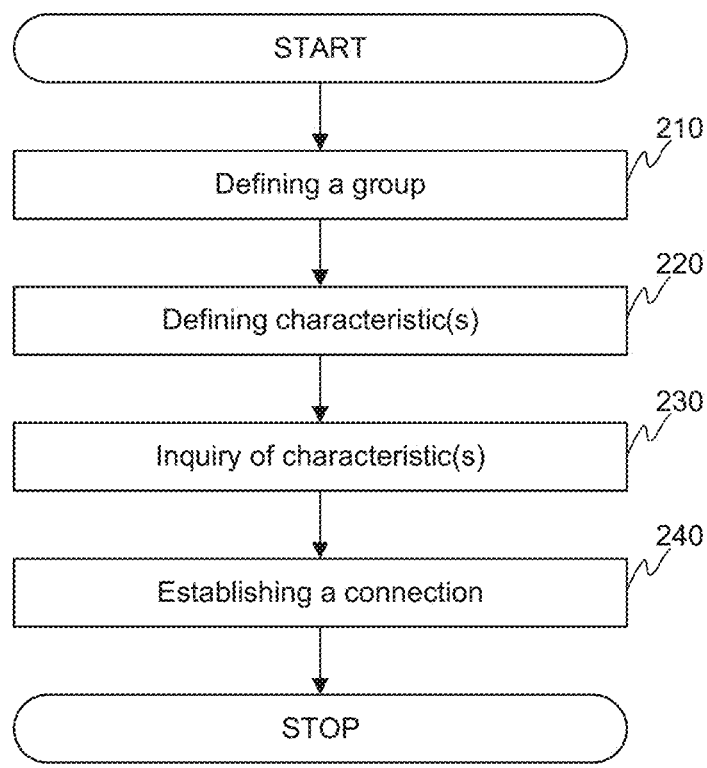
FIG. 2 illustrates schematically an example of a method according to an embodiment of the invention.

Further aspects relating to the present invention are now described by referring to FIG. 2 in which it is schematically illustrated an example of a method according to an inventive idea of the present invention. The method relates to a procedure for establishing a connection to a subscriber identity module belonging to a group 150 as schematically illustrated in FIG. 1. According to the method a group 150 is first defined 210 into which group 150 a plurality of subscriber identity modules is defined. The definition of the group 150 is implemented in a memory of a subscriber identity module assigned as a master subscriber identity module 125 for the group 150. The implementation of the definition may be performed by a telecom operator assigning the plurality of subscriber identity modules to a user or in some embodiment of the invention the user may define the subscriber identity modules in the group by herself/himself/ itself. The telecom operator may e.g. format the subscriber identity module by introducing and storing in the memory space of the subscriber identity module 125 data defining one or more other subscriber identity modules, which belong to the same group 150 with the first subscriber identity module 125, i.e. the master subscriber identity module, and any other data as will be described. The term "telecom operator" in this context shall be understood in a broad manner representing at least a party authorized to grant the subscriber identity modules for users. In an embodiment in which a user may manage the group e.g. by adding and deleting subscriptions to and from the group 150 e.g. a specific application executed e.g. in a terminal device 120 in which the first subscriber identity module 125 resides may be used. For example, the application may enable an addition and/or a deletion of a subscription in the group by using an identifier of the subscriber identity module in question. In other words, the application used for managing the group may e.g. receive as an input the identifier of the subscriber identity module whose information is modified, such as added or deleted, with respect to the group 150. In some embodiment the application executed e.g. by the terminal device 120 in which the first subscriber identity module 125 resides may offer for selection one or more subscriber identity modules 135, 145 accessible to the user, e.g. on the basis of the first subscriber module 125. In response to this the user may select a subscriber identity module 135, 145 and a desired function, such as addition or deletion, with respect to it and in that manner manage the group 150 in question.

Next, in response to a definition of the at least one other subscriber identity module 135, 145 in the group at least one characteristic relating to accessing the at least one other subscriber identity module 135, 145 is defined 220 for the other subscriber identity module 135, 145 in question and stored in the memory of the first subscriber identity module 125. The definition of the at least one characteristic relating to accessing the at least one other subscriber identity module 135, 145 may e.g. be implemented so that the other subscriber identity module 135, 145 is selected, e.g. in response to a user action with the terminal device 120, and the selection may cause the first subscriber identity module 125 to communicate with a network element, such as a database storing applicable data, for obtaining further data relating to the selected subscriber identity module 135, 145, i.e. the data comprising at least one characteristic relating to accessing the at least one other subscriber identity module 135, 145. In some other embodiment the user, or the application executed in the terminal device 120, may define the data comprising the at least one characteristic with respect to the selected subscriber identity module 135, 145.

For sake of clarity it is herein mentioned that the device by means of which the group 150, and the subscriber identity modules with respect to the group 150, is managed may be any other device than the one carrying the first subscriber identity module 125. In such an embodiment an access to input and output data, as well as to modify, in the memory of the first subscriber identity module 125 is arranged to the device used for managing.

Figures 3, 4, 5:
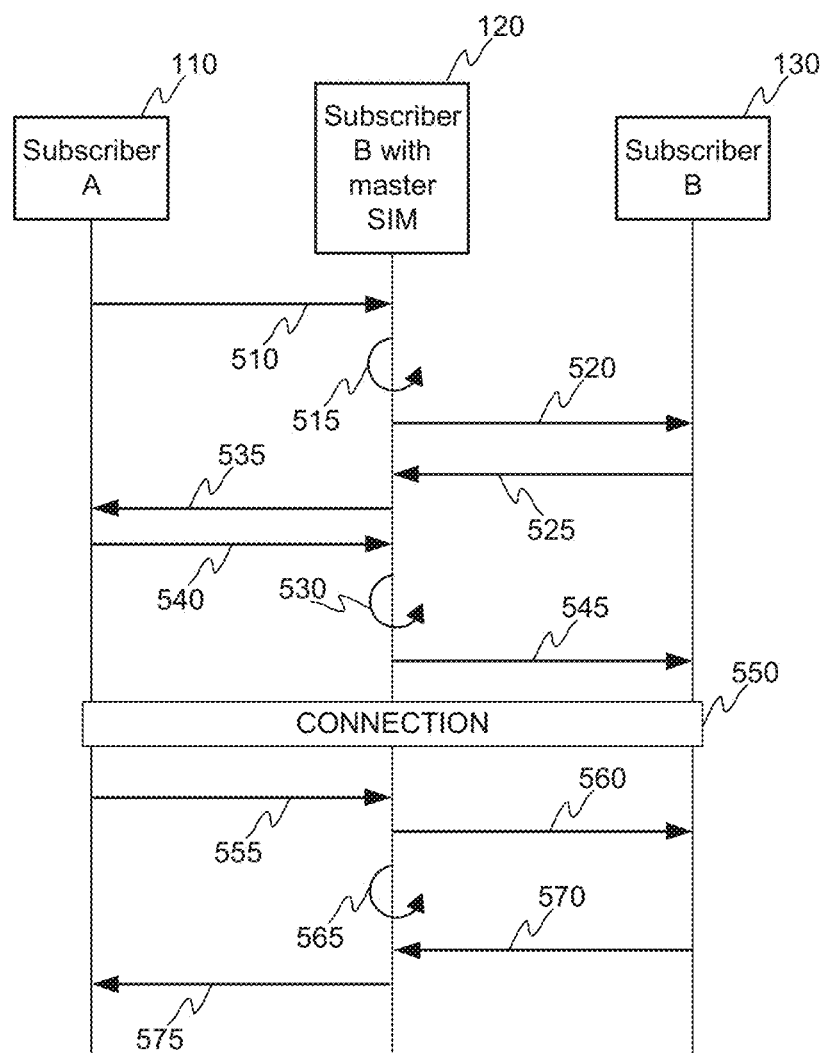
FIG. 3 illustrates schematically an example of a data record defining a group according to an embodiment of the invention.
FIG. 4 illustrates schematically an example of a data table according to an embodiment of the invention.
FIG. 5 illustrates schematically least some aspects of the invention as a signal flow chart according to an embodiment of the invention.

FIG. 3 schematically illustrates an example of a data record defining a group 150 of subscriber identity modules. The data record may be stored in the memory of the first subscriber identity module 125. The data record may be implemented in a form of a data table as schematically illustrated in FIG. 3. The first column of the data table titled with "ID" may e.g. define subscriber identity modules belonging to the group 150 in question at an instant of time.

The first row may e.g. define data of the first subscriber identity module 125 (indicated with SIM-M in FIG. 3) and the following rows may be dedicated to data of other subscriber identity modules 135, 145 (indicated with SIM-1 and SIM-2 in FIG. 3). It is clear that the number of subscriber identity modules of a group is not anyhow limited in view of the present invention. The second column of the data table titled with "Access characteristic(s)" may define, for each of the subscriber identity modules belonging to the group, at least one characteristic for accessing the at least one other subscriber identity module. The characteristics are denoted with markings A, B and C in FIG. 3. The characteristic may comprise, or define, but is not limited to, at least one communication type, such as an access protocol, through which the subscriber identity module in question may be accessed. Alternatively or in addition, the characteristic may refer to a device type in which the subscriber identity module in question resides. Still further, the characteristic may comprise a definition for an access protocol to be used when accessing the certain subscriber identity module. Also, the characteristic may define one or more functionalities available for use with respect to the subscriber identity module when accessing the subscriber identity module in question.

FIG. 4 schematically illustrates an example of a data table in which at least some data representing access characteristics for the present invention are disclosed. In the non-limiting example of FIG. 4 the access characteristics may e.g. be Device type, Communication type, Access protocol and Functionality. These characteristics may be relevant in one way or another in accessing the subscriber identity module in question. The characteristic of device type may comprise information on the device into which the subscriber identity module is installed to, whereas the characteristic of communication type may define mechanisms through which the subscriber identity module may be accessed to. Some non-limiting examples of these are call, short message (SMS), multimedia message (MMS), data connection. Furthermore, the characteristic of access protocol may define e.g. network technologies through which the data over the communication type may be transferred with the subscriber identity module in question. Finally, the characteristic may define functionalities, which are available for the subscriber identity module. For example, one may establish a call with the subscriber identity module or the subscriber identity module may be configured or modified.

For sake of clarity it is to be understood that the device in which a subscriber identity module in question resides executes an application with corresponding user interface integrated to the device so that a communication call from the device (A subscriber) to the targeted and desired device with another subscriber identity module (B subscriber) may be initiated and triggered from the application through an interaction with the user interface. Master subscriber identity module 125 stores necessary information for parsing the incoming and outgoing calls between subscribers A and B.

By reverting back to FIG. 2 a preparation of the above described definitions allows utilization of the definitions for the group 150 in a context of connection establishment. This may e.g. refer to a situation in which a terminal device 110 is willing to establish a communication connection to some subscriber, i.e. a terminal device equipped with a subscriber identity module belonging to the group 150. Specifically, this relates to a situation in which the terminal device 110 attempts to reach either the subscriber represented with the subscriber identity module 135 residing in the terminal device 130 or the subscriber represented with the subscriber identity module 145 residing in the terminal device 140. In other words, the aim is to reach the terminal device not being selected to be represented by the first subscriber identity module 115 being the master in the group 150. In such a situation the terminal device 110 is aware of a destination address, such as Mobile Station International Subscriber Directory Number (MSISDN) or International Mobile Subscriber Identity (IMSI) of the subscriber identity module 135, 145 which destination address is such that the connection attempt is directed to the first subscriber identity module 125, i.e. to the terminal device equipped with the subscriber identity module 125, by the mobile communication network. The connection attempt is conveyed as a connection request in the mobile communication network so that the connection request reaches the first subscriber identity module 125. In other words, the connection request is received by the terminal device 120, which may derive, from the connection request, an indication on at least one device, represented with the subscriber identity module 135, 145, as a destination of the connection attempt. The indication refers e.g. to an identifier included in the connection request, which identifies the subscription represented with the subscriber identity module in the mobile communication network which subscription belongs to the group 150. For example, the party 110 willing to communicate e.g. with the terminal device 130 equipped with the subscriber identity module 135 is aware of destination address, such as Mobile Station International Subscriber Directory Number (MSISDN), of the first subscriber identity module 125 being the master SIM of the group and its destination address is used for establishing the connection to the terminal device 130. This is achieved so that the connection request also carries the indication on the subscription belonging to the group 150 being the final destination of the connection request which is derived by the terminal device 120, or an application executed by the terminal device 120. In response of retrieval of the identifier of the subscriber identity module being the final destination of the connection request the terminal device 120, i.e. the application executed in the terminal device 120, may be configured to inquire 230 at least one characteristic relating to access the subscriber identity module 135, 145 from the memory of the first subscriber identity module 125. This may be implemented e.g. so that the application generates an inquiry to the memory wherein the inquiry comprises the identifier retrieved from the connection request. The memory returns, in response to the query, data stored in the memory in the context of the subscriber identity module identified in the inquiry if data with respect to the subscriber identity module is stored. In other words, the response to the inquiry comprises at least one characteristic relating to accessing the subscriber identity module identified in the connection request.

In response to the receipt of the response comprising the at least one characteristic relating to accessing the subscriber identity module identified in the connection request the application executed in the terminal device 120 equipped with the first subscriber identity module 125 may be configured to establish a connection 240 to the subscriber identity module indicated in the connection request in accordance with the at least one characteristic relating to accessing the at least one subscriber identity module. In other words, the application may be configured to read the data with respect to accessing the subscriber identity module 135 in question and take the data as a parameter, or as an instruction, for establishing the connection. For example, the application may utilize information relating to communication type available for use for the subscriber identity module in question and establish the connection with that communication type. This may e.g. refer to a generation of a message to the terminal device 130 equipped with the subscriber identity module 135. In other words, the communication connection is established in accordance with the access information stored in the memory. As indicated the connection may refer to a generation of a message, establishing a call connection or establishing a data connection, for example. This may be understood so that the first subscriber identity module 125 may be configured to, by means of an application executed by the terminal device 120, route or forward the connection to the final destination address i.e. at least one of the terminal devices 130, 140 equipped with the subscriber identity module 135, 145 in question.

In FIG. 5 at least some aspects of the invention are described as a one possible alternative for a signal flow chart, whilst other possibilities to establish a connection exist as well. Namely, in signal 510 a connection request may be carried from the terminal device 110 equipped with a subscriber identity module 115. The connection request may e.g. be a call setup in which the destination address may e.g. be the MSISDN number of the first subscriber identity module 125 residing in the terminal device 120. Further, the connection request carries an indication on at least one device represented with a subscriber identity module into which the terminal device 110 is willing to establish the connection. In other words, the device indicated in the connection request may belong to a group having the subscriber identity module 125 residing in the terminal device 120 as the master subscriber identity module of the group. In response to the receipt of the connection request the terminal device 120 may parse information necessary for routing and forwarding the connection request to the terminal device corresponding to the indication in the connection request. The parsing and the connection forwarding operation is referred with 515 in FIG. 5. As a result the terminal device 120 may route the connection request, such as the call setup, to the destination device, which in the example of FIG. 5 is the terminal device 130 equipped with a subscriber identity module 135. The terminal device 130 may be configured to acknowledge 525 the call setup to the terminal device 120, which is forwarded to the original subscriber A 110. In response to this the terminal device 110 initiates requesting bandwidth capacity 540 from the communication network which is indicated to the terminal device 120. The reservation of the bandwidth between the mentioned terminal devices 110, 120 and the communication network is referred with arrow 530 in FIG. 5. The terminal device 110 and the terminal device 130, and/or the terminal device 140 accordingly, may also agree on a necessary bandwidth 545 internally by utilizing the subscriber identity modules residing in each of the devices, the available network capacity, network capacity information residing in the master SIM, 120 and 125 of the group 150. Finally a connection 550 is established between the terminal device 110 and the terminal device 130. At some point of time either of the communicating entities may request disconnecting of the connection. In the example as described in FIG. 5 the terminal device 110 represented by the subscriber identity module 115 initiates the disconnecting with the signal 555. This is forwarded from the terminal device 120 to the terminal device with signal 560, and the bandwidth capacity is set free in the communication network (arrow referred with 565). The entities, i.e. terminal device 130 and the terminal device 120 acknowledge the completion of the disconnection as indicated with signals 570 and 575 in FIG. 5. The signaling disclosed in an exemplified manner in FIG. 5 follows SS7 signaling. However, the present invention is not limited to this only, but any other signaling protocol may be applied in the context of the present invention. For example, a so-called Session Initiation Protocol (SIP) may be used. Naturally, the addressing of the parties being involved in the communication is performed according to the signaling protocol selected for implementing at least part of the present invention. As mentioned the embodiment disclosed in FIG. 5 is an example wherein the communication is initiated by the terminal device 110. Correspondingly, the communication may be initiated by the terminal device 120 or terminal device 130 or 140. In such embodiments the corresponding communication between the entities is also implemented by means of the subscription residing in the terminal device 120.

Figure 6:
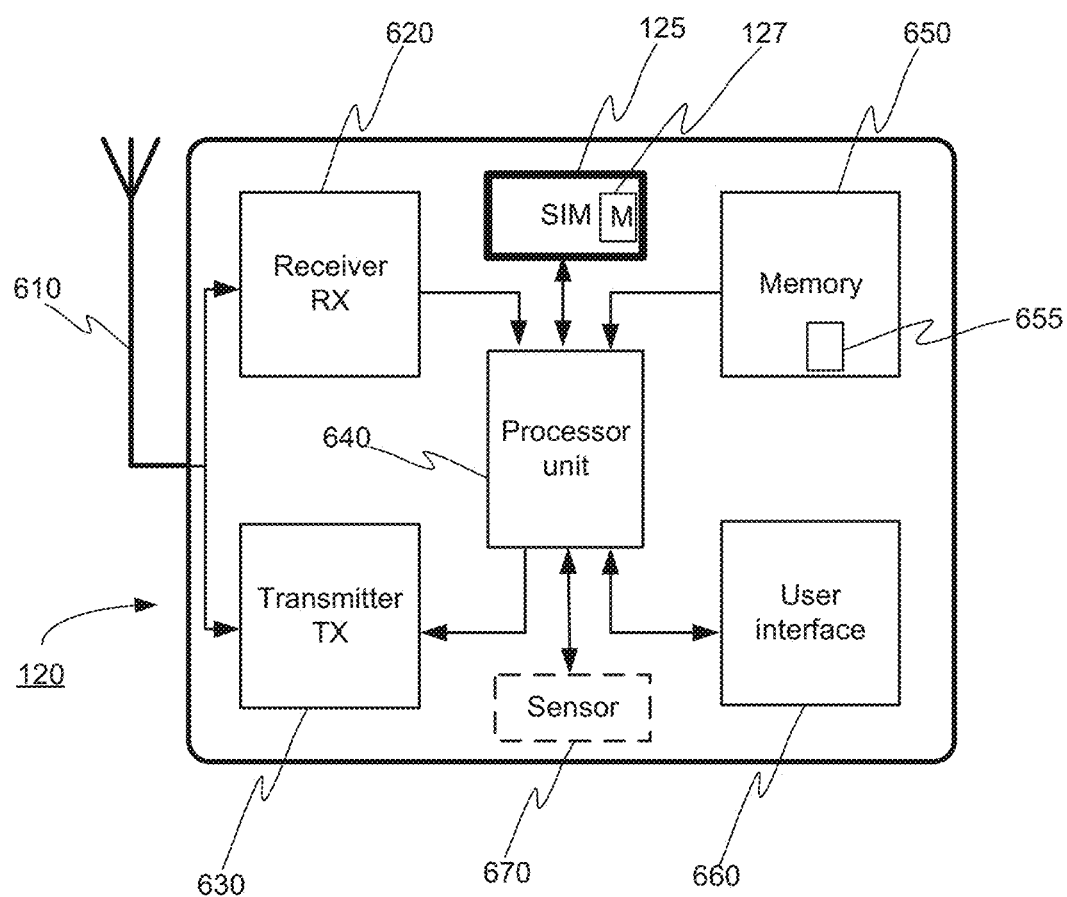
FIG. 6 illustrates schematically a terminal device according to an embodiment of the invention.

As said, at least one party of a connection establishment in the manner as described is a terminal device 120 equipped with the first subscriber identity module 125. FIG. 6 illustrates, by way of example, the main functional parts of a terminal device 120 according to an embodiment of the invention. The terminal device 120 may use an antenna 610 in the transmission and reception of signals with the serving mobile communication network. The receiver RX of the terminal device 120 is shown by reference 620. The terminal device 120 may comprise one or more receiver(s) RX in order to be capable of communicating over one or more network technologies. Reference 630 denotes the transmitter TX of the terminal device 120. All the signal processing measures required when transmitting to the serving mobile communication network are performed by the transmitter module 130. The terminal device 120 may comprise one or more transmitter(s) TX in order to be capable of communicating over one or more network technologies. In the terminal device 120 the processor unit 540 may control operations of the transmitter 630 and the receiver 620 among other tasks. According to at least some embodiments of the invention the processor unit 640 is configured to control an access to a subscriber identity module 125 in the manner as described. For example, the processor unit 640 may be configured to derive an identifier of a subscriber identity module from a connection request and to generate an inquiry to the first subscriber identity module 125 residing in the terminal device 120. Moreover, the processor unit 640 may be configured to generate, or to establish, a connection in accordance with the access information retrieved from the memory 127 of the subscriber identity module 125.

The processor unit 640 may also control a memory 650, in which the application program required in the implementation of the method according to the invention may advantageously be saved. The memory 650 may comprise advantageously one or more internal and/or external memories (e.g., ROM, RAM, FLASH, USB, CD-ROM, etc.). The memory 650 is advantageously capable of saving computer program code 655 which is utilized in the embodiments of the invention.

Further, the processor unit 640 advantageously accomplishes process steps of the invention by executing proper computer program code instructions according to the embodiments of the invention. The processor unit 640 may be implemented by a processor, which may comprise but is not limited to one microprocessor. It may also comprise at least one processor with an accompanying digital signal processor or one or more special-purpose computer chips, one or more field-programmable gate arrays (FPGA), one or more controllers and one or more application-specific integrated circuits (ASICS).

The terminal device 120 may further comprise other entities and devices, such as user interface related devices 560 and one or more sensors 570 for introducing at least some other entities and devices. Naturally, the other entities and devices are dependent on the type of device in which the subscriber identity module 125 resides.

At least some aspects of the present invention may relate to a processor-readable non-transitory storage medium on which is stored one or more sets of processor executable instructions, e.g. in a form of portions of computer program code 655, configured to implement one or more of steps of the method as described. The instructions may also reside, completely or in part, within a main memory, the static memory, and/or within the processor during execution thereof by the at terminal device in question. The term computer-readable medium shall also cover, but is not limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

The aspects of the present invention are mainly described above in a situation in which an external terminal device 110 equipped with a subscriber identity module 115. However, the invention is not limited to such a situation, but is similarly applicable in a situation in which a subscriber belonging to the group 150 initiates a connection. The connection may be initialized to a subscriber being external to the group 150, e.g. the terminal device 110 in FIG. 1, or the connection may be established between the subscribers within the group 150. In both mentioned situations the connection request from the subscriber initiating the connection is conveyed to the first subscriber identity module 125 by the mobile communication network, wherein the terminal device 120 is configured to, by means of the first subscriber identity module 125, to perform at least some of the method steps as described for establishing the connection in accordance with the information stored in a memory 127 of the subscriber identity module 120. In other words, the mobile communication network may be configured to, in response to a receipt of a connection request from one of the subscription represented by the subscriber identity modules 135, 145 to obtain, e.g. from a register, such as HLR or HSS, data indicating that the connection request is to be conveyed to the subscription represented by the first subscriber identity module 125 in the mobile communication network. As mentioned the terminal device 120 performs at the some of the method steps according to the invention in response to the receipt of the connection request therein. Especially in case the connection request is directed towards another subscription belonging to the group the terminal device 120 may obtain necessary characteristics from the stored data in the memory 125 for establishing the connection inside the group. In case the connection request is directed to an external entity of the group 150 the destination address, such as a MSISDN, is carried in the connection request to the subscriber represented by the first subscriber identity module 125 in the mobile communication network. Naturally the same applies to the situation in which the connection request is directed to a subscription belonging to the group 150.

The invention is applicable to any situation in which the devices equipped with the subscriber identity modules belonging to the same group reside in the same mobile communication network and/or in the same or different cell(s) therein or even if the devices equipped with the subscriber identity modules are served with different mobile communication network, i.e. at least some of the devices are roaming subscribers in some communication network.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for establishing a connection to a terminal device equipped with a subscriber identity module, the method comprising:

defining a plurality of subscriber identity modules as a group in a memory of a first subscriber identity module belonging to the group;

defining, for at least one of the other plurality of subscriber identity modules belonging to the group other than the first subscriber module, at least one characteristic relating to accessing the at least one of the other plurality of subscriber identity modules, the defining the at least one characteristic relating to accessing the at least one of the other plurality of subscriber identity modules occurring in the memory of the first subscriber identity module;

in response to a receipt of a connection request in a terminal device equipped with the first subscriber identity module, the connection request indicating the at least one subscriber identity module belonging to the group as a destination of the connection request, inquiring the at least one characteristic relating to accessing the at least one subscriber identity module from the memory of the first subscriber identity module by retrieving an identifier of the at least one subscriber identity module that is the destination from the connection request;

receiving, from the memory of the first subscriber identity module after the inquiring, the at least one characteristic relating to accessing the at least one subscriber identity module that is the destination of the connection request using the retrieved identifier; and establishing, from the terminal device equipped with the first subscriber identity module, a connection to another terminal device equipped with the at least one subscriber identity module indicated in the connection request in accordance with the at least one characteristic relating to accessing the at least one subscriber identity module received from the memory of the first subscriber identity module.

2. The method of claim 1, wherein the at least one characteristic relating to accessing the at least one of the other plurality of subscriber identity modules represents at least one of the following: a communication type, a device type, an access protocol, and a functionality available for use with respect to the subscriber identity module.

3. The method of claim 1, wherein the inquiry of the at least one characteristic relating to accessing the at least one of the other plurality of subscriber identity modules from the memory of the first subscriber identity module comprises:

generating the inquiry to the memory by including the identifier of the at least one subscriber identity module in the inquiry, and receiving, in response to the inquiry, data associated to the identifier in the memory, the data representing the at least one characteristic.

4. The method of claim 1, wherein the connection request indicating the at least one subscriber identity module belonging to the group as the destination of the connection request is one of the following: a call setup signaling, a message transmittable over a mobile communication network, and at least one data packet conveyed over a data connection.

5. The method of claim 1, wherein the definition of the plurality of the subscriber identity modules as the group in the memory of the first subscriber identity module and the definition of the at least one characteristic relating to accessing the at least one of the other plurality of subscriber identity modules in the memory of the first subscriber identity module is performed by at least one of the following: the terminal device equipped with the first subscriber identity module, and a device granted access to the memory of the first subscriber identity module over a communication connection.

6. A terminal device equipped with a first subscriber identity module, the terminal device comprising:
at least one processor;
at least one memory including computer program code;
the at least one memory and the computer program code configured to, with the at least one processor, cause the terminal device to:
define a plurality of subscriber identity modules as a group in a memory of a first subscriber identity module belonging to the group,
define, for at least one of the other plurality of subscriber identity modules belonging to the group other than the first subscriber module, at least one characteristic relating to accessing the at least one of the other plurality of subscriber identity modules, the defining the at least one characteristic relating to accessing the at least one of the other plurality of subscriber identity modules occurring in the at least one memory of the first subscriber identity module,
in response to a receipt of a connection request in the terminal device equipped with the first subscriber identity module, the connection request indicating the at least one subscriber identity module belonging to the group as a destination of the connection request, inquire the at least one characteristic relating to accessing the at least one subscriber identity module from the memory of the first subscriber identity module by retrieving an identifier of the at least one subscriber identity module that is the destination from the connection request,
receive, from the memory of the first subscriber identity module after the inquiring, the at least one characteristic relating to accessing the at least one subscriber identity module that is the destination of the connection request using the retrieved identifier, and
establish, from the terminal device equipped with the first subscriber identity module, a connection to another terminal device equipped with the at least one subscriber identity module indicated in the connection request in accordance with the at least one characteristic relating to accessing the at least one subscriber identity module received from the memory of the first subscriber identity module.

7. The terminal device of claim 6, wherein the at least one characteristic relating to accessing the at least one of the other plurality of subscriber identity modules stored in the memory represents at least one of the following: communication type, device type, access protocol, and functionality available for use with respect to the subscriber identity module.

8. The terminal device of claim 6, wherein the terminal device is configured to, during the inquiry of the at least one characteristic relating to accessing the at least one of the other plurality of subscriber identity modules from the memory of the first subscriber identity module:
generate the inquiry to the memory by including the identifier of the at least one subscriber identity module in the inquiry, and
receive, in response to the inquiry, data associated to the identifier in the memory, the data representing the at least one characteristic.

9. The terminal device of claim 6, wherein the connection request indicating the at least one subscriber identity module belonging to the group as the destination of the connection request is one of the following: a call setup signaling, a message transmittable over a mobile communication network, and at least one data packet conveyed over a data connection.

10. The terminal device of claim 6, wherein the terminal device is configured to define the plurality of the subscriber identity modules as the group in the memory of the first subscriber identity module and to define the at least one characteristic relating to accessing the at least one of the other plurality of subscriber identity modules in the memory of the first subscriber identity module either internally or in response to a signaling over a communication connection from a device granted access to the memory of the first subscriber identity module.

11. A system comprising:
a terminal device equipped with a first subscriber identity module; and
at least one other terminal device equipped with another subscriber identity module other than the first subscriber identity module,
wherein the system is configured to:
define the first subscriber identity module and the at least one other subscriber identity module as a group in a memory of the first subscriber identity module,
define, for at least one of the other plurality of subscriber identity modules belonging to the group other than the first subscriber module, at least one characteristic relating to accessing the at least one of the other plurality of subscriber identity modules, the defining the at least one characteristic relating to accessing the at least one of the other plurality of subscriber identity modules occurring in the memory of the first subscriber identity module,
in response to a receipt of a connection request in the terminal device equipped with the first subscriber identity module, the connection request indicating a subscriber identity module belonging to the group as a destination of the connection request, inquire the at least one characteristic relating to accessing the at least one subscriber identity module from the memory of the first subscriber identity module by retrieving an identifier of the at least one subscriber identity module that is the destination from the connection request,
receive, from the memory of the first subscriber identity module after the inquiring, the at least one characteristic relating to accessing the at least one subscriber identity module that is the destination of the connection request using the retrieved identifier, and
establish, from the terminal device equipped with the first subscriber identity module, a connection to the at least one other terminal device equipped with the at least one subscriber identity module indicated in the connection request in accordance with the at least one characteristic relating to accessing the at least one subscriber identity module received from the memory of the first subscriber identity module.

12. A non-transitory computer-readable medium on which is stored a computer program for establishing a connection to a terminal device equipped with a subscriber identity module, which, when executed by at least one processor of the terminal device, causes the terminal device to perform the method according to claim 1.

13. A non-transitory computer-readable medium on which is stored a computer program for establishing a connection to a terminal device equipped with a subscriber identity module, which, when executed by at least one processor of the terminal device, causes the terminal device to perform the method according to claim 2.

14. A non-transitory computer-readable medium on which is stored a computer program for establishing a connection to a terminal device equipped with a subscriber identity module, which, when executed by at least one processor of the terminal device, causes the terminal device to perform the method according to claim 3.

15. A non-transitory computer-readable medium on which is stored a computer program for establishing a connection to a terminal device equipped with a subscriber identity module, which, when executed by at least one processor of the terminal device, causes the terminal device to perform the method according to claim 4.

16. A non-transitory computer-readable medium on which is stored a computer program for establishing a connection to a terminal device equipped with a subscriber identity module, which, when executed by at least one processor of the terminal device, causes the terminal device to perform the method according to claim 5.

17. The method of claim 1, further comprising receiving, as an input, a subscription to the group or a removal from the group of one of the subscriber identity modules of the group using the identifier of the one subscriber identity modules being subscribed to the group or being removed from the group.

* * * * *